(12) United States Patent
Dai et al.

(10) Patent No.: US 11,301,438 B2
(45) Date of Patent: Apr. 12, 2022

(54) SYSTEM FOR AUTOMATED DATA ENGINEERING FOR LARGE SCALE MACHINE LEARNING

(71) Applicant: Petuum Inc., Pittsburgh, PA (US)

(72) Inventors: Wei Dai, Pittsburgh, PA (US); Weiren Yu, Pittsburgh, PA (US); Eric Xing, Pittsburgh, PA (US)

(73) Assignee: Petuum Inc., Pittsburgh, PA (US)

( * ) Notice: Subject to any disclaimer, the term of this patent is extended or adjusted under 35 U.S.C. 154(b) by 0 days.

(21) Appl. No.: 17/009,883

(22) Filed: Sep. 2, 2020

(65) Prior Publication Data

US 2021/0026818 A1 Jan. 28, 2021

Related U.S. Application Data

(62) Division of application No. 15/959,560, filed on Apr. 23, 2018, now Pat. No. 11,119,992.

(60) Provisional application No. 62/660,131, filed on Apr. 19, 2018, provisional application No. 62/489,974, filed on Apr. 25, 2017.

(51) Int. Cl.
*G06F 16/21* (2019.01)
*G06N 20/00* (2019.01)
*G06F 16/27* (2019.01)
*G06F 15/76* (2006.01)

(52) U.S. Cl.
CPC ............ *G06F 16/213* (2019.01); *G06F 15/76* (2013.01); *G06F 16/273* (2019.01); *G06N 20/00* (2019.01)

(58) Field of Classification Search
CPC ...... G06F 16/213; G06F 15/76; G06F 16/273; G06N 20/00
See application file for complete search history.

(56) References Cited

U.S. PATENT DOCUMENTS 6,665,677 B1 * 12/2003 Wotring ............... G06F 16/258
2003/0120651 A1 6/2003 Bernstein et al.
2005/0065911 A1 3/2005 Ellis et al.
(Continued)

*Primary Examiner* — Cam Y T Truong
(74) *Attorney, Agent, or Firm* — Enshan Hong; MagStone Law, LLP

(57) ABSTRACT

Accordingly, a data engineering system for machine learning at scale is disclosed. In one embodiment, the data engineering system includes an ingest processing module having a schema update submodule and a feature statistics update submodule, wherein the schema update submodule is configured to discover new features and add them to a schema, and wherein the feature statistics update submodule collects statistics for each feature to be used in an online transformation, a record store to store data from a data source, and a transformation module, to receive a low dimensional data instance from the record store and to receive the schema and feature statistics from the ingest processing module, and to transform the low dimensional data instance into a high dimensional representation. One embodiment provides a method for data engineering for machine learning at scale, the method including calling a built-in feature transformation or defining a new transformation, specifying a data source and compressing and storing the data, providing ingest-time processing by automatically analyzing necessary statistics for features, and then generating a schema for a dataset for subsequent data engineering. Other embodiments are disclosed herein.

10 Claims, 5 Drawing Sheets

(56) References Cited

U.S. PATENT DOCUMENTS

| | | | |
|---|---|---|---|
| 2006/0173873 A1* | 8/2006 | Prompt | G06F 16/258 |
| 2014/0279838 A1* | 9/2014 | Tsirogiannis | G06F 16/22 707/603 |
| 2016/0371395 A1 | 12/2016 | Dumant et al. | |
| 2017/0024388 A1 | 1/2017 | Bentley et al. | |
| 2018/0013861 A1 | 1/2018 | Howard et al. | |
| 2018/0246974 A1 | 8/2018 | Shukla et al. | |

* cited by examiner

SYSTEM FOR AUTOMATED DATA ENGINEERING FOR LARGE SCALE MACHINE LEARNING

RELATED PRIOR APPLICATIONS

This application is a Divisional Application of Ser. No. 15/959,560, entitled "System for Automated Data Engineering for Large Scale machine Learning" filed on Apr. 23, 2018, which claims priority to Provisional Application Ser. No. 62/489,974 entitled "System for Automated Data Engineering for Large Scale Machine Learning" filed on Apr. 25, 2017 and Provisional Application Ser. No. 62/660,131 entitled "System for Automated Data Engineering for Large Scale Machine Learning" filed on Apr. 19, 2018, the contents of which are incorporated herein by reference in their entirety.

FIELD OF INVENTION

The present invention generally relates to feature engineering for data-center machine learning systems, and more particularly, a distributed data engineering system that provides a standardized interface for online data transformation.

BACKGROUND

Machine learning (ML) is becoming an increasingly popular application in the cloud and in data-centers. Machine Learning systems depend on data engineering, which is the practice of transforming a small set of raw measurements to a large number of features, to substantially increase the accuracy of their results. As used herein, a feature means an individual measurable property of a phenomenon being observed. The features are usually represented by a vector, where each element value is a feature. However, as machine learning systems scale and grow in both data size (number of records) and model size (number of dimensions), existing systems that support data engineering have not been able to keep up with it; they either fail to run or do so very slowly. Sometimes, implementation specific code can be written to "glue" together several machine learning software tools, resulting in a special-purpose machine learning system that indeed supports large-scale data engineering, but is time-consuming to create, brittle to maintain, and difficult to reproduce by other practitioners. It is therefore desirable to have a data engineering system that is distributed for scale and speed, and provides a standardized interface for data transformation.

A standardized interface data engineering interface not only makes transformations independent of whichever programming language is used to write machine learning algorithms, but also integrates with upstream machine learning training systems to derive new transformations (such as feature outputs from deep learning models), as well as downstream machine learning training systems that will ingest the features as training inputs. This modularity allows practitioners to build scalable machine learning systems in a reproducible manner, and eliminates the need for implementation specific glue code to join machine learning tools together.

SUMMARY

Accordingly, a data engineering system for machine learning at scale is disclosed. In one embodiment, the data engineering system includes an ingest processing module having a schema update submodule and a feature statistics update submodule, wherein the schema update submodule is configured to discover new features and add them to a schema, and wherein the feature statistics update submodule collects statistics for each feature to be used in an online transformation, a record store to store data from a data source, and a transformation module, to receive a low dimensional data instance from the record store and to receive the schema and feature statistics from the ingest processing module, and to transform the low dimensional data instance into a high dimensional representation.

Another example embodiment provides a method for data engineering for machine learning at scale, the method including calling a built-in feature transformation or defining a new transformation, specifying a data source and compressing and storing the data, providing ingest-time processing by automatically analyzing necessary statistics for features, and then generating a schema for a dataset for subsequent data engineering. Other embodiments are disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION

Figure 1:
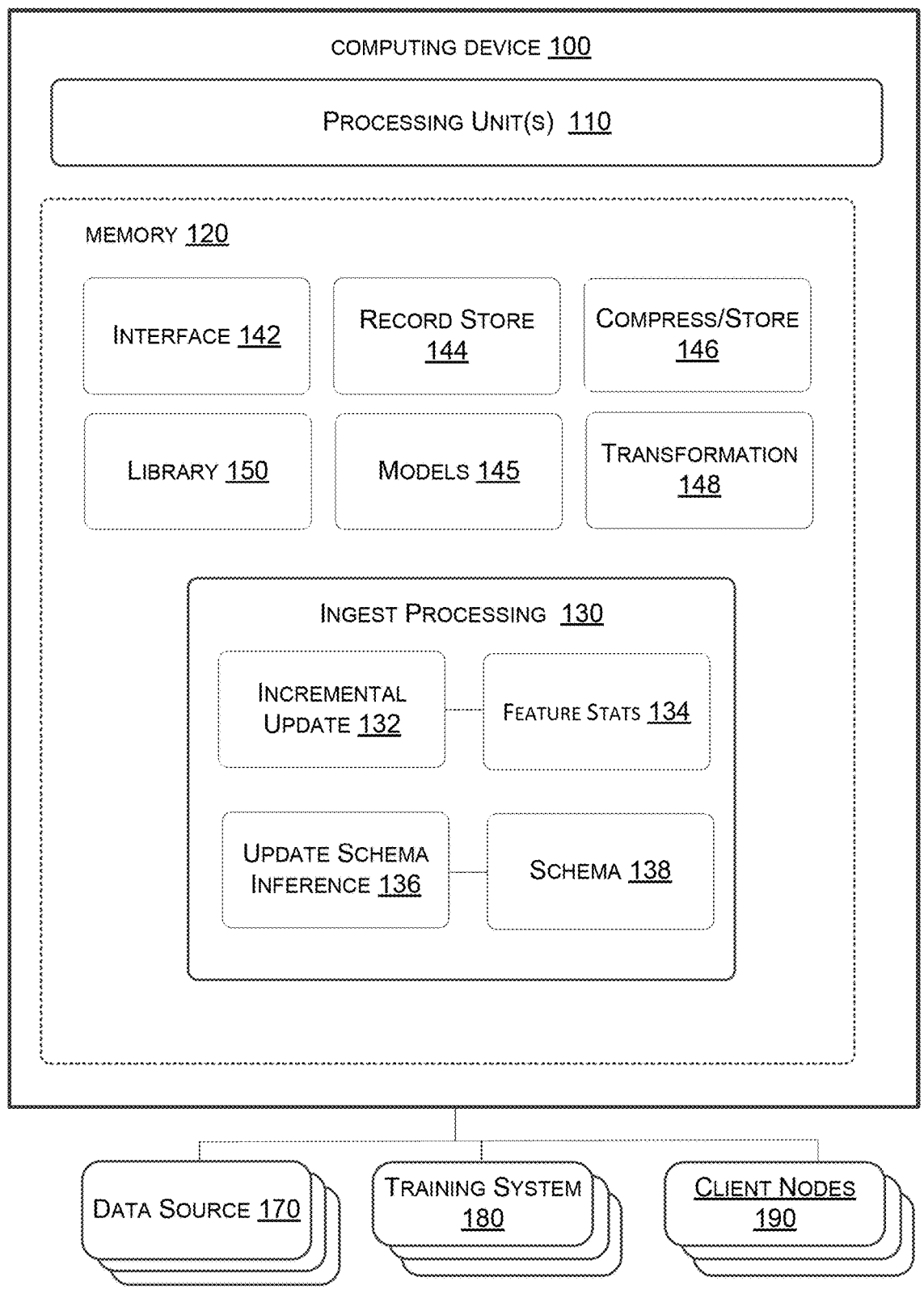
FIG. 1 illustrates one embodiment system for automated data engineering for large scale machine learning.

The following description is presented to enable a person of ordinary skill in the art to make and use the invention. Descriptions of specific devices, techniques, and applications are provided only as examples. Various modifications to the examples described herein will be clear to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

The specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented Generally, disclosed herein is a scalable data engineering system which can be distributed for scale and speed and which may provide built-in transformations that are independent of programming language used to write machine learning algorithms. Some embodiments include a standardized interface for transforming feature representations and some integrate with upstream machine learning training systems to derive new transformations such and with downstream machine learning training systems that will ingest the provided features as training inputs.

A typical data engineering example includes a data expansion from low dimensional measurements to high dimensional representations. This expansion step often introduces a disconnect in the tool chains for practitioners of large-scale machine learning. While some data processing systems and machine learning training systems have partial support for the needs of data engineering, these systems typically do not support the ultra-high dimensional feature expansion or large datasets.

Machine learning practitioners often have to build customized systems to perform data engineering at scale, or write implementation specific code that strings multiple systems together, taking advantage of their respective strengths. A hand-crafted approach is non-automatic and time-consuming, difficult to maintain, not necessarily reproducible or transferable to different machine learning tools, and is not necessarily guaranteed to perform well. A proliferation of hand-crafted systems also makes it challenging for machine learning practitioners to consistently reproduce each other's results.

In this way, a modular machine learning system that provides from data collection through evaluation and serving, and which can be quickly specialized to different large-scale machine learning problems by swapping out training systems and yet be set up in a consistent and reproducible manner. We now turn to the embodiment system as illustrated in FIG. 1.

FIG. 1 illustrates one embodiment system 100 for automated data engineering for large scale machine learning. System 100 includes one or more processing units 110, and a memory 120 having various modules and data stored therein. The present example, also includes an ingest processing module 130, with a feature statistics submodule 134 and a schema submodule 138, along with and incremental updater 132 for feature statistics and an update scheme inference 136 to update schema 138, as will be explained below in more detail.

Illustrated system 100 further includes an interface module 142, a record store 144, a compress/store module 146, a library 150, models 145, and a transformation module. In some embodiments once a transformation is trained it may be cached in the library 150 for a future use without having to recalculate the transformation.

In one embodiment, system 100 is a data engineering system for machine learning at scale, including an ingest processing module 130 having a schema update submodule 136 and a feature statistics update submodule 134, wherein the schema update submodule 136 is configured to discover new features and add them to a schema 138, and wherein the feature statistics update submodule 134 collects statistics for each feature to be used in an online transformation 148. In some embodiments, feature statistics 134 may be collected while data is being added to the ingesting processing module, while in some embodiments feature statistics may be collected asynchronously in the background prior to transformation.

The present embodiment further includes a record store 144 to store data from a data source, and a transformation module 148 to receive a low dimensional data instance from the record store 144 and to receive the schema and feature statistics from the ingest processing module 130 and to transform the low dimensional data instance into a high dimensional representation.

In some embodiments, system 100 may be configured to receive feature outputs from deep learning modules from an upstream machine and to derive new transformations from the deep learning modules. Additionally, system 100 may provide features to a downstream system that will ingest the features as training inputs.

Figure 2:
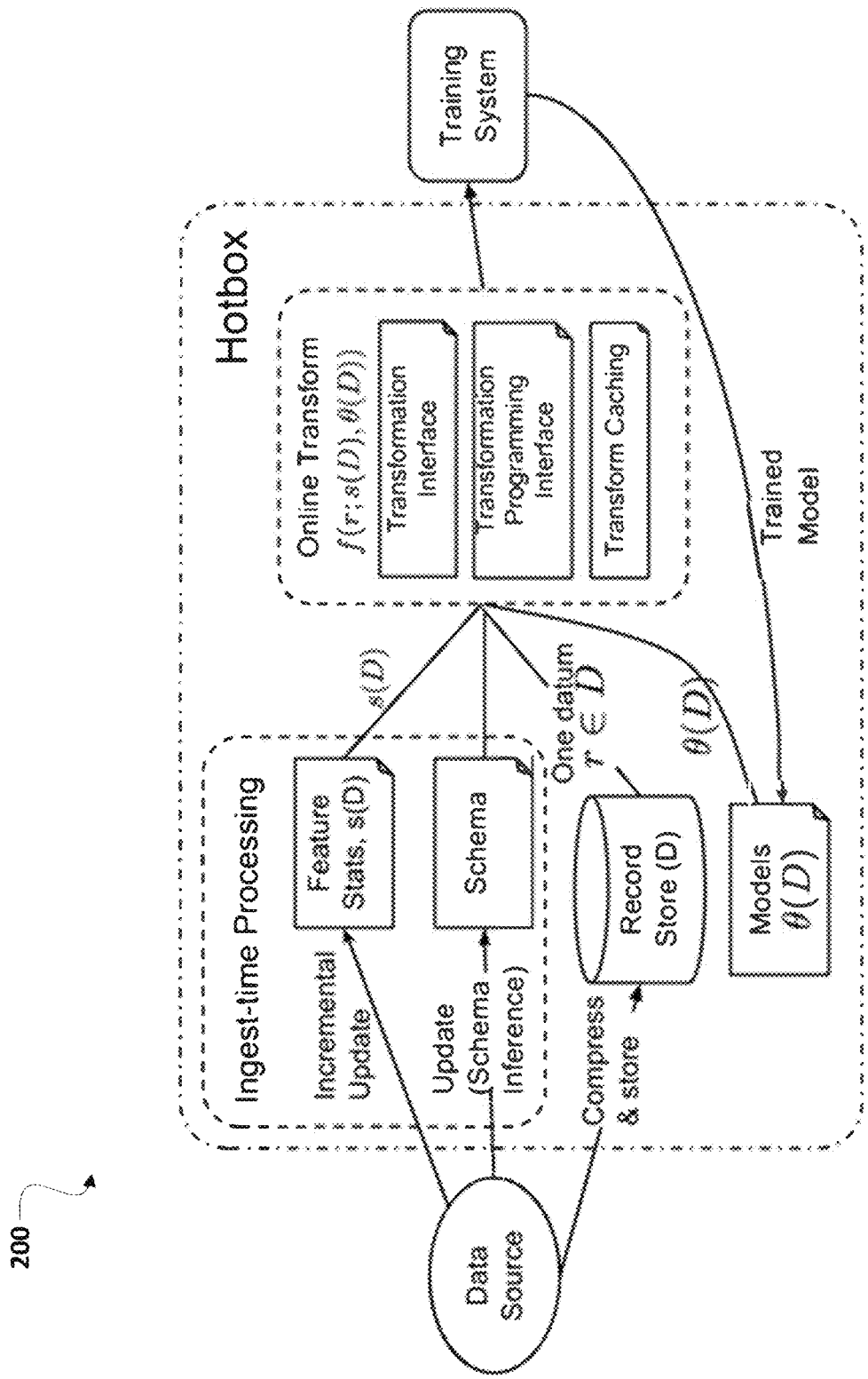
FIG. 2 presents an exemplary data engineering system for machine learning at scale according to the embodiment of the invention.

FIG. 2 presents an overview of a system 200 for machine learning at scale according to the exemplary data engineering system 100 in FIG. 1. With reference to the figure, the record store module stores data instances as a sequence of records ranked according to the ingest order. Typically, a logically grouped record sequence constitutes a dataset. In the illustrated system 200, each dataset has a schema that defines the fields of each row. In some embodiments, the system 200 may be optimized for a range query, where the range is defined over the row ordering, according to data access pattern of many scalable machine learning algorithms.

The record store module may store schemas of the features. In this embodiment, the schema is designed to efficiently represent high dimensional data and support succinct specification of an arbitrary set of features used in complex transformations. Even if users might not be able to explicitly specify all the high dimensional features, even at high dimension (e.g., post-transformation schema), the schema is easy to examine by the users to facilitate further data engineering. The present embodiment uses the schema to describe features at each stage of the transformation pipeline, including the original dataset and the final transformed output.

The above benefits are enabled by the design of feature family, family index and feature name. In the present example, a feature family is a group of logically related features, such as features representing one-hot vector or neural nets features. In some embodiments, all features belong to one feature family. The feature family is used to serve two purposes including a feature family allows users to select groups of features by selecting feature families, and a feature family provides semantics at the group level, which in some cases allows us to elide storing the details of individual features and represent high dimensional schema much more efficiently.

To scale feature schemas to a high dimension, a dense and sparse feature family may be used. A dense feature family can store the meta data for each feature explicitly, similar to the table schema in most databases. This allows users to individually specify the meta data of these features (e.g., data type, storage type), and access these features by a user-assigned name string. Storing meta data for each feature can incur significant overhead at a high dimension.

To scale in dimensionality, a group of features like the output of a one-hot transformation and Cartesian product often share the same meta data. Furthermore, these are features generated from transformations without user-assigned field names. Thus, a sparse feature family representation is used to store these meta data at the feature family level instead of at the feature level. In practice, most of the dimensions generated from transformation can be represented by sparse feature family.

For a high dimensional dataset, for example, millions of dimensions, it is not generally practical or useful to manually assign individual names to each field of a table. However, it is sufficient to know which value a field in the one-hot vector corresponds to, without instantiating a name for that field. On the other hand, most of the fields in the raw low dimensional data can come with manually assigned field names. To support the flexibility for high dimensional features and rich feature semantics, a dual feature specification system may be used. In one non-limiting example, all features can be referred to based on its index in the family, and a feature can optionally have a human-readable name by which the feature can be referenced.

The ingest-time processing module, corresponding to ingest processing 130, comprises a schema update and feature states update. The present embodiment has a schema that is designed to be extensible and schema update is configured to discover new features from the incoming data and added to schema at ingest time. In the present example, newly added features are assumed to have value 0 on previously ingested data and do not incur any rewrite.

With reference to the example embodiment 200 in FIG. 2, if the schema is explicitly defined, the user may optionally declare the size and feature names of each feature family and bypass schema construction at ingest-time. The present embodiment collects statistics for each feature to facilitate online transformation. Statistics collection can occur at ingest time or, like building indexes in database DB systems, asynchronously in the background before the transformation takes place. By construction, the feature statistics can be computed incrementally with the arrival of each new data instance, and are usually fast to compute. In the present example, the model module 145 is responsible for connecting to upstream training system and using their trained models for feature transformation.

In this example embodiment, the online transformation module 148 may use a master-worker architecture. The master maintains the feature schema, feature statistics, and other meta-data necessary for workers to access data. During an on-line transformation 148, the master also performs schema resolution to generate the output schema. The master, however, does not perform transformation on the data, which is done in parallel by client nodes 190 through a client library 150. In the present example, workers may be stateless while the master is stateful, which can be made fault tolerance through consensus protocols like Raft and Paxos, however, other embodiments are no so limited.

We now describe how an embodiment online transformation works. Transformation may be a function $f$ that takes as input a single (including transformed) data instance $r \in D$ restricted to a subset of dimensions, input feature statistics $S(D)$, and other parameters $\theta(D)$ such as model parameters, and returns a fixed-sized vector. The present embodiment allows arbitrary function $f$. $f$ is stateless, and may not modify the state of the data table, feature statistics, or the model parameters.

Transformations may also be chained in a sequence of transformations. This chaining may allow users to create high dimensional feature sets through complex operations composed by common transformations. For example, the present embodiment allows transformations 148 to take an arbitrary set of features as input, which could come from multiple transformations. In general, transformations can form an acyclic transformation graph, where transformation A depends on B if the input features of A intersect with the output of B.

With reference to FIG. 2, a schema 138 resolution can perform transformations 148 on the schema 138 following the topologically ordered transformation graph. This helps ensure that each transformation 148 has a well-defined input and output. The schema resolution also produces the physical layout of the features that are sent to the client nodes 190 to perform the transformation 148. The illustrated embodiment 200 aims to support general transformations, and there is limited materialization optimization opportunity due to the black box approach to transformation function. When the workers perform transformation, the present embodiment simply materializes transformation according to the order used in schema resolution.

Continuing the description of how an embodiment online transformation works, a session may be a transient context defined by transformation parameters and the data table it operates on. A session therefore may define the output from the queried tables. A session exists if at least one client node 190 is connected to the session. New client nodes 190 can join an existing session, and all workers in the same session will receive the same view of the dataset, but may request different range of data. Once a session is created, any dataset modification (ingest, delete, etc.) is not visible to the workers in the session.

The present embodiment allows dynamic membership in a session since the distributed training systems it intends to work with could itself suffer fault or scale elastically. An existing worker can drop out of a session, and a new worker can join throughout the session. The membership of a session is maintained by the master, and the master removes a session when all its member workers have disconnected.

The transformation interface 142 is the interface to perform transformation using built-in transformation or user defined transformation. It takes in the following argument: 1) input feature selector, 2) transformation parameters and 3) optional output feature family. In the present embodiment, outputs from a transformation belong to the output feature family. However, this is by way of example and other embodiments may not be so limited. If the user wants to use the output transformation as an input for another transformation 148, the user needs to specify the output feature family in order to refer to the output features in another transformation.

In the online transform block in FIG. 2, the transformation programming interface is the interface to implement new transformations. For example, to implement new transformations, a developer may call functions to transform a schema and to generate a transform.

At a high level, the transformations form a directed acyclic graph through their dependencies. A transform schema function may take as inputs a resulting feature schema from a preceding transformation in the dependency graph and; and the input features defined in the transformation configuration. In the present embodiment, a transform schema function is expected to add a new feature family of an arbitrary size and data type. A generate transform function specifies the actual transformation computation. The function takes as input a data instance with fields that conform to the input schema given to a transform schema function, as well as the transformation parameters and input feature specifiers.

In order to reduce redundant computation, the present embodiment exploits the caching optimization opportunities with a transformation caching module providing for 1) the same transformations could be loaded many times, with different combinations of transformations each time, 2) repeated access to the same transformation results. Depending on input data, the computation cost and output feature size would vary greatly. The present embodiment implements a cost function that favors caching certain intermediate results that are expensive to compute but generate relatively small outputs and cheap to store on disk.

Figure 3:
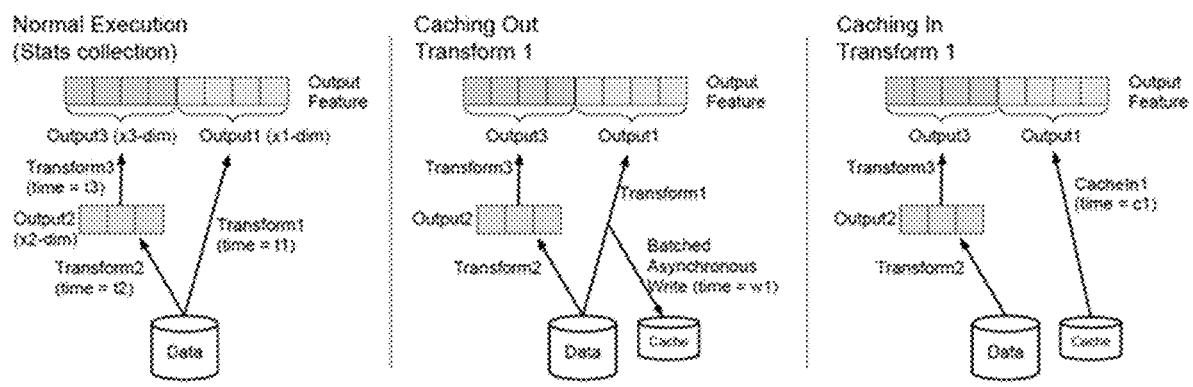
FIG. 3 illustrates one embodiment of a transformation caching strategy.

FIG. 3 illustrates an embodiment with transformation caching. In this example, the first time a transformation is executed under normal execution, the transformation is computed. In the computation, feature statistics are collected to evaluate if an output should be cached for later use. The next time a transformation is executed, the system 100 will instruct client nodes 190 to cache out the output of transformation 148 selected by a cache manager. The data is then written to disk in an asynchronous manner to minimize impact on transformation time.

In some embodiments, batching may be employed at the data level and transformation level, as shown in the middle example of FIG. 3. After caching, if the same transformation is encountered, the data can then be read asynchronously in batches. During transformation, the cached data is directly used as output values without computation, as shown in the far-right example.

By way of example, a straightforward implementation of online transformation would incur computation of the feature transformation each time the data is requested. In many database applications this re-computation of a query is unavoidable, because the underlying data could change frequently and so do the queries. Data engineering, however, has certain characteristics that offer opportunities for optimization. First, data engineering is a highly iterative process, in which features transformations are incrementally added, trained, and evaluated.

Therefore, the same transformations could be loaded many times, with different combinations of transformations each time. Second, many machine learning algorithms need to take multiple passes over the dataset for the algorithm to reach a good model estimate (i.e., convergence of an algorithm), thus leading to repeated access of the same transformation 148 results.

Furthermore, feature transformations can vary greatly in computation cost and output feature size, which can also depend on the input data. For example, a cartesian product is generally not computation intensive but produces outputs much larger than the input size. In contrast, neural network transformation, especially for a deeper, more complex architecture, involves much more operations to generate a small set output features. These variations in transformation, together with the repeated computation, opens up the opportunity to cache certain intermediary output features to avoid re-computation and speed up the transformation 148.

Intuitively, transformations that are expensive to compute but generate relatively small outputs and thus cheap to store on disk and read back, would be good candidates for caching. Since the outputs of a transformation in SystemX 457 are always grouped under a single feature family, it is natural to support caching operating at the level of feature family. This allows us to selectively cache transformations at the semantic level that is also compatible with the system architecture of SystemX 457 and system 100 and 200.

Figure 4:
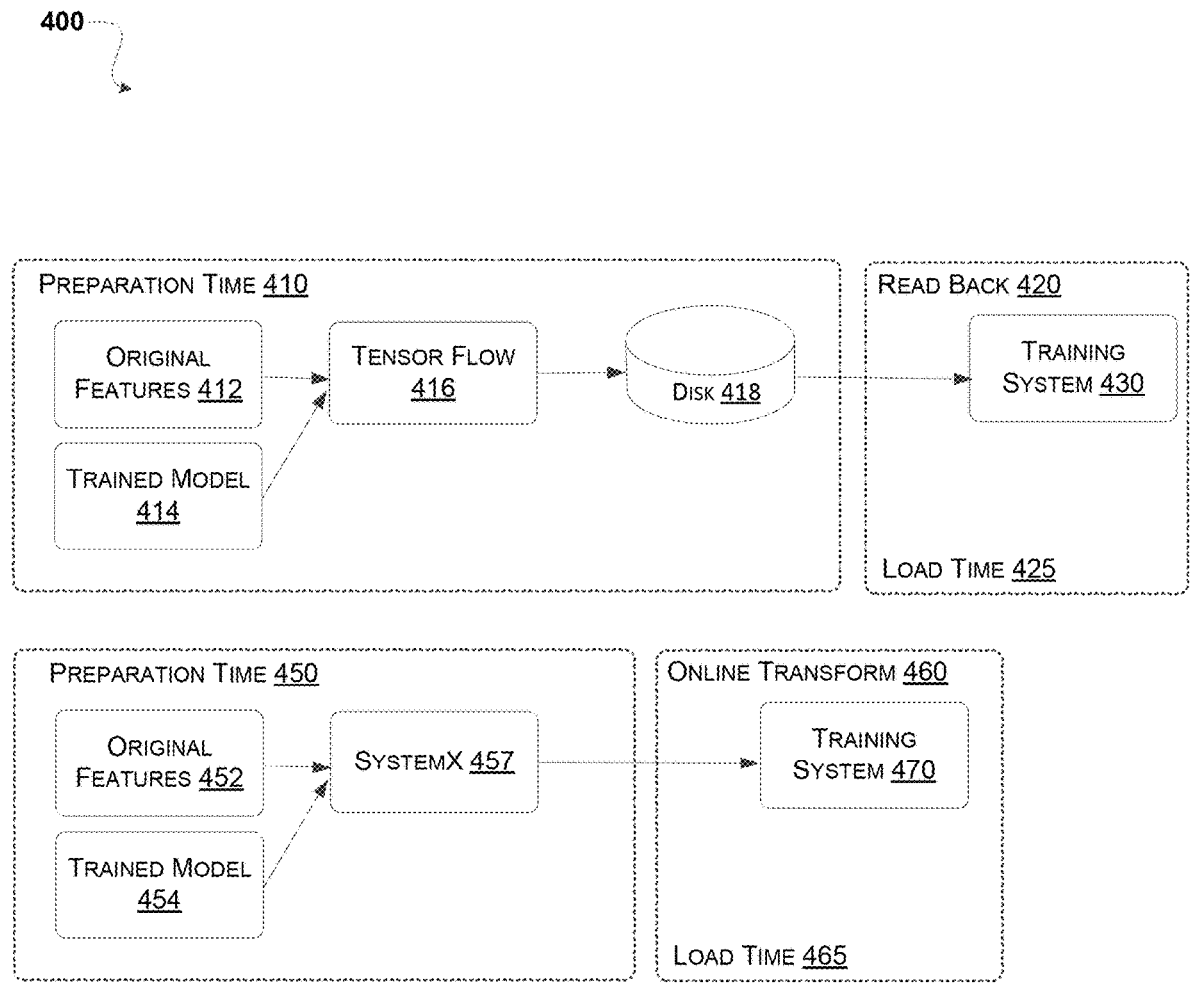
FIG. 4 presents a workflow demonstrating a transformation comparison between a traditional system and one embodiment system.

FIG. 4 illustrates a transformation workflow comparison 400 between a baseline system and one embodiment illustrated as systemX 457. As shown in the illustration, workflow may be divided into two phases including preparation time 410 and 450, and load time, 425 and 465, respectively. The baseline approach uses a system that produces the trained models (e.g., TensorFlow 416 in this case) to materialize features 412 onto disk 418.

On the other hand, systemX 457 is illustrated performing a transformation on-the-fly with a trained model 145 by directly connecting to a downstream training system, thus avoiding a bottleneck in disk 418 input and output. This workflow does not presume a specific training system and can work with different downstream training systems such as Spark, Scikit-learn, etc., and others suitable training systems as understood by those skilled in the art.

Figure 5:
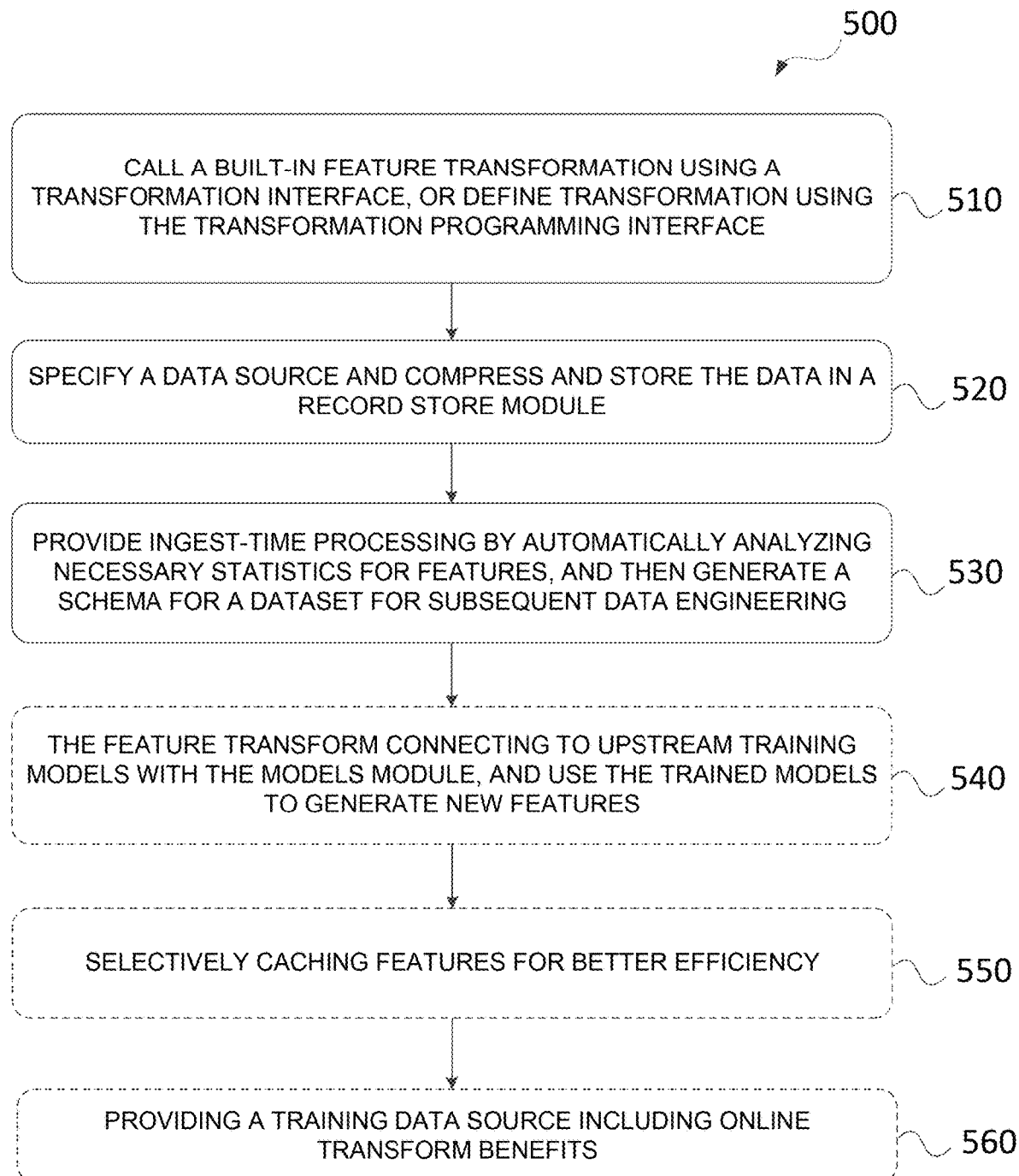
FIG. 5 illustrates a flowchart of a method for data engineering.

FIG. 5 illustrates a flowchart of an embodiment method 500 for data engineering. In block 510, the method calls a built-in feature transformation using a transformation interface 142, or define transformation using the transformation programming interface 142. Then, method 500 specifies a data source and compress and store the data in a record store module, as shown in block 520.

Method 500 provides ingest-time processing by automatically analyzing necessary statistics for features, and then generate a schema for a dataset for subsequent data engineering as shown in block 530. In some embodiments, method 500 may include the feature transform connecting to upstream training models with the Models module 145, and use the trained models to generate new features as shown in block 540. Additionally, method 500 may include selectively caching features for better efficiency, for example, with the cache and library system of FIGS. 1 and 2. In some embodiments, method 500 may further include providing a training data source including online transform benefits. While the FIG. 5 flowchart shows one embodiment method, other system embodiments disclosed herein, when actively being used may similarly provide methods of data engineering.

While various embodiments of the invention have been described above, they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

Additionally, although the disclosure is described above in terms of various exemplary embodiments and implementations, the various features and functionality described in one or more of the individual embodiments are not limited in their applicability to the particular embodiment with which they are described. They instead can be applied alone or in some combination, to one or more of the other embodiments of the disclosure, whether or not such embodiments are described, and if such features are presented as being a part of a described embodiment. Thus, the breadth and scope of the present disclosure should not be limited by any of the above-described exemplary embodiments.

In this document, the terms "module" and "engine" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

The invention claimed is:

1. A data engineering system for machine learning at scale, comprising:
   one or more processing units; and a memory comprising:
   an ingest processing module having a schema update submodule and a feature statistics update submodule, wherein the schema update submodule is configured to:
   discover new features and add the new features to a feature schema, wherein the feature statistics update submodule collects feature statistics for each feature to be used in an online transformation, wherein the feature statistics are computed incrementally and an online transformation module uses a master-worker architecture to facilitate a master to maintain the feature schema and the feature statistics for allowing one or more workers to access data in a data source, wherein the master performs, during the online transformation, a schema resolution to generate an output schema based on the feature schema;
   a transformation interface performing the online transformation using built-in transformation or user defined transformation based on at least one argument, wherein the at least one argument comprising input feature selector, transformation parameters, and optional output feature family;
   a record store to store the data from the data source; and
   a transformation module to receive a low dimensional data instance from the record store, to receive the feature schema and the feature statistics from the ingest processing module, and to transform the low dimensional data instance into a high dimensional representation, wherein the schema resolution performs the online transformation based on a session defined by the transformation parameters and a data table operated by the session which defines an output from queried tables, wherein the session, exists, if at least one client node is connected to the session, wherein the session allows joining of new client nodes, and the one or more workers in the same session receives a same view of a dataset and requests different range of the data.

2. The system of claim 1, further comprising a library to cache transformations for future use without having to recalculate the online transformation.

3. The system of claim 2, wherein when there are multiple transformations, the library can cache at least one of intermediate results or final transformation.

4. The system of claim 1, wherein feature statistics are collected while data is being added to the ingesting processing module.

5. The system of claim 1, wherein feature statistics are collected asynchronously in a background prior to transformation.

6. The system of claim 1, wherein the system is configured to receive feature outputs from deep learning modules from an upstream machine and to derive new transformations from the deep learning modules.

7. The system of claim 1, wherein the system can provide features to a downstream system that will ingest the features as training inputs.

8. The system of claim 1, wherein the system stores data as rows in tables and the data is ordered by an ingest order, and wherein each table has a schema that defines fields of each row.

9. The system of claim 1, further comprising a plurality of at least one of the ingest processing module, the record store, and the transformation module, wherein the plurality is distributed on multiple computers.

10. The system of claim 1, wherein the system defines a range over a row ordering according to data access pattern of a plurality of scalable machine learning algorithms.

* * * * *